United States Patent
Odaohhara et al.

(10) Patent No.: US 6,986,067 B2
(45) Date of Patent: Jan. 10, 2006

(54) METHOD AND APPARATUS FOR REDUCING POWER CONSUMPTION IN A POWER SUPPLY

(75) Inventors: Shigefumi Odaohhara, Yamato (JP); Hironari Nishino, Hachiouji (JP); Hideaki Nakanishi, Machida (JP)

(73) Assignee: Lenovo (Singapore) PTE LTD, (SG)

( * ) Notice: Subject to any disclaimer, the term of this patent is extended or adjusted under 35 U.S.C. 154(b) by 576 days.

(21) Appl. No.: 10/074,965

(22) Filed: Feb. 13, 2002

(65) Prior Publication Data

US 2002/0190579 A1   Dec. 19, 2002

(30) Foreign Application Priority Data

Feb. 20, 2001   (JP)   ............................ 2001-044204

(51) Int. Cl.
*G06F 1/32*   (2006.01)
(52) U.S. Cl. .................... 713/320; 713/322
(58) Field of Classification Search ............... 713/300, 713/320, 322; 323/283, 20, 49
See application file for complete search history.

(56) References Cited

U.S. PATENT DOCUMENTS

| | | | |
|---|---|---|---|
| 5,126,930 A * | 6/1992 | Ahn | ........................ 363/21.05 |
| 5,469,349 A * | 11/1995 | Marinus | .................. 363/21.08 |
| 5,703,764 A * | 12/1997 | Hermann et al. | ........ 363/21.16 |
| 6,127,816 A * | 10/2000 | Hirst | ........................ 323/283 |
| 6,288,914 B1 * | 9/2001 | Sato | ........................... 363/18 |
| 6,294,904 B1 * | 9/2001 | Hirst | ........................ 323/283 |
| 6,295,217 B1 * | 9/2001 | Yang et al. | ................... 363/49 |
| 6,373,724 B2 * | 4/2002 | Nagai et al. | .................. 363/20 |

FOREIGN PATENT DOCUMENTS

GB    2279161 A   * 12/1994
JP    2000-30857    * 11/2000

* cited by examiner

*Primary Examiner*—Chun Cao
(74) *Attorney, Agent, or Firm*—Scott W. Reid (57)   ABSTRACT

The present invention provides a method, apparatus an device for reducing power loss by lowering an operating frequency of a power supply device in a standby state such as soft-off state, suspend state, or a state in which a line is not connected. In one aspect of the present invention, an AC adaptor connectable to a main body of an apparatus through a power line, comprising a rectifying and smoothing unit, a switching unit, and an operating frequency supplying unit, is provided for.

16 Claims, 8 Drawing Sheets

8A  Maximum ouput current $I_0$

8B  Output current $I_0{}^2$ (=$I_0$/100)

METHOD AND APPARATUS FOR REDUCING POWER CONSUMPTION IN A POWER SUPPLY

BACKGROUND OF THE INVENTION

1. Field of the Invention

The present invention relates to a power supply device connected to an AC power source for generating a DC voltage, and more particularly to a power supply device that reduces power loss.

2. Description of Related Art

In recent years, environmental problems, such as global warming, have attracted public attention, prompting interests in the reduction of power loss in power supply devices, such as AC adaptors. In response, certain AC adaptors connected to commercial alternating current (AC) power sources having reduced power loss during waiting time have been marketed. For certain conventional products, ranges for such reduction in loss have gone from 3 W to about 0.5 W.

Published Unexamined Patent Application No. 8-205399 discloses a technique for sensing the presence of load from the amplitude of the output voltage from an AC adaptor, and reducing power consumption by stopping the operation when the output side is in no-load state. Published Unexamined Patent Application No. 2000-308257 discloses a power source circuit that is constituted so as to activate equipment to which power is supplied from a power source circuit by starting the supply of power on receiving an output from the internal power source provided in the equipment, and to stop power supply completely when the equipment is in the standby state.

As in the above-described AC adaptors, although power loss in the standby state can be reduced to about 0.5 W in recent years, further reduction of power loss must be attempted when environmental problems, such as global warming, are considered. Particularly, it is very desirable from the point of view of energy saving to significantly reduce power consumption in waiting time when the apparatus is not operated (when the main apparatus is not connected).

However, in PCs (personal computers) or note PCs (notebook type personal computers), for example, since the main body of the apparatus must be maintained in a soft-off state in order to operate the main body, for example, when an external signal comes in, even if the main body is in a power-off state, there is often a problem to turn the output off completely. Also, for example, while notebook PCs and desktop PCs have a suspend function of halting the machine (while maintaining the operating state of the program), it is often also the situation where a reduction in power loss is needed when only the bare minimum power needed for maintaining the data is available.

Also in the technique disclosed in the above-described Published Unexamined Patent Application No. 8-205399, the presence of load is sensed from the amplitude of the output voltage from the AC adaptor, and, as a result, the presence of load cannot be sensed from the amplitude of the voltage when the current is very small during the soft-off state or the like. In order to sense a very small current, a current sensing resistor that has a high resistance is used, and a large voltage drop occurs in a maximum load. Therefore, it is difficult to constitute a practical AC adaptor that maintains the output voltage constant using such a technique.

Furthermore, according to the above-described Published Unexamined Patent Application No. 2000-308257, since the output is completely turned off, the method is not applicable to a soft-off or suspend state introduced in note PCs or the like. Also, there is a problem that the AC adaptor cannot be turned on any more, when the battery is disconnected, or the battery is dead.

SUMMARY OF THE INVENTION

The present invention intends to solve the above-described technical problems, and an object of the present invention is to save the power loss of a power supply device in a prescribed waiting time.

Another object of the present invention is to provide a device that can accommodate a low-load operation such as in a soft-off or suspend state even if in the state of reduced power in the waiting time, regardless of the presence of the battery in the main body.

In order to achieve such objects, the present invention reduces power loss through a low-speed switching operation, for example, in a power supply device provided inside or outside a main apparatus (the main body of an apparatus), for example when the power supply device is not connected to the main apparatus, or when the main apparatus is in the standby state, such as in a soft-off or suspend state. Namely, in a preferred embodiment, the present invention is an AC adaptor connectable to the main body of an apparatus through a power line, comprising a rectifying and smoothing means for rectifying and smoothing an inputted alternating current voltage, a switching means for switching the voltage rectified and smoothed by the rectifying and smoothing means, and an operating frequency supplying means for supplying the operating frequency of switching performed by the switching means, wherein the operating frequency supplying means supplies a first operating frequency to the switching means when the main body of the apparatus operates normally, and supplies a second operating frequency, which is lower than the first operating frequency, to the switching means when the power line to the main body of the apparatus is separated, or when the main body of the apparatus is in a prescribed standby state.

In a preferred embodiment, a plug for connecting the power line to the main body of the apparatus is provided, and the plug comprises an operating section that operates to switch the operating frequency when connected to the main body of the apparatus, in order to operate the main body at the first operating frequency when the plug is inserted in the jack provided in the main body, and at the second operating frequency when the plug is disconnected from the jack. Also, in present invention, by selecting the design method, for example, a special operating section is provided in relation to the plug, without any special change in the main body side of the apparatus.

This power line comprises a voltage line for a secondary output voltage outputted on the basis of switching by the switching means and a DC return line, as well as a control line for switching the operating frequency supplied by the operating frequency supplying means. Furthermore, if the operating frequency supplied by the operating frequency supplying means is switched by short-circuiting or opening the control line against the DC return line, for example, the short-circuiting or opening operation of the main body of the apparatus can switch operating frequencies. However, if the AC adaptor is distinguishable, the switching can be realized with an unlimited combination, such as 5V and opening or 5V and output voltage ($V_{acdc}$), as well as short-circuiting and opening.

In another preferred embodiment, the present invention is a power supply device for supplying electric power to the main body of the apparatus by performing a prescribed switching operation, comprising a switching means for performing a switching operation for the primary power source, and a control means for controlling the switching operation performed by the switching means, wherein the control means controls the switching means on the basis of the first operating frequency, and controls the switching means on the basis of the second operating frequency, which is lower than the first operating frequency when the main body is in a low power consumption mode.

Here, the power supply device may further comprise an output voltage line required for supplying electric power to the main body of the apparatus, e.g., a DC return line of the GND level, as well as a control line the state of which is changed by whether the main body is in a low power consumption mode or not, the state of the control line being capable of being changed by the operation from said main body, and the control means switches between the first operating frequency and the second operating frequency on the basis of the state of the control line. For a particular aspect, the power supply device may comprise a control means for controlling the switching means so as to perform the switching operation when the main apparatus (the main body of the apparatus) is in a prescribed waiting mode.

Furthermore, the present invention can be understood as electrical equipment comprising a DC voltage supply device inside or outside the equipment, and electrical equipment comprising a power supply device such as an AC adaptor. In these cases, when the main body is in a prescribed standby state such as a suspend or soft-off state, the operating frequency supply means is shifted to a standby state mode. Further, it is also envisioned that the AC adaptor may operate the switching circuit with the power converted to a direct current voltage from an alternating current voltage, and shifts the switching circuit to the low-power mode to operate the switching circuit with an operating frequency that is lower than the normal operating frequency on the basis of the operation of the operating section, for example, provided in the plug, performed in response to the opening of the power line.

In another aspect of the present invention a method for controlling the power supply device for supplying a DC voltage to the main body of the apparatus by switching the direct current voltage obtained by rectifying and smoothing an alternating current voltage is provided for. For example, switching is performed in the first operating frequency when the main body performs the normal operations, other than in a standby state, such as line disconnection, suspend, and soft-off states; and switching is performed in the second operating frequency, which is lower than the first operating frequency, when the main body is in these standby states.

DETAILED DESCRIPTION

The present invention will be described in detail below referring to the embodiment shown in the attached drawings.

Figure 1:
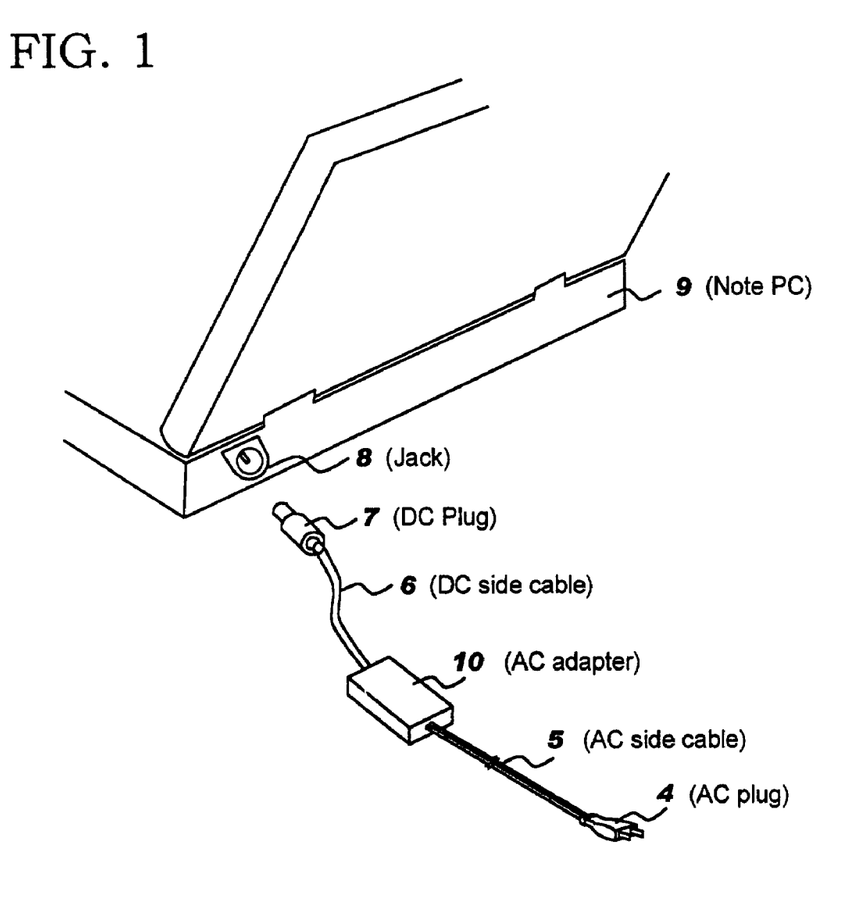
FIG. 1 is a schematic diagram illustrating the structure of a computer system that uses an AC adaptor in accordance with a preferred embodiment of the present invention.

FIG. 1 is a diagram for illustrating a schematic constitution of a computer system that uses an AC adaptor in accordance with a preferred embodiment of the present invention. Power from a 100-V commercial alternating current power source (AC power source) is supplied to an AC adaptor 10, which is a power supply device, through an AC plug 4 and an AC cable 5. The AC adaptor 10 converts an AC power source voltage to a direct current voltage (DC voltage) of, for example, about 16 V by the switching regulator method. The output from the AC adaptor 10 is transmitted to a DC cable 6 and a DC plug 7. By inserting the DC plug 7 in a jack 8 of the note PC 9, a DC voltage can be supplied to the note PC 9. In the note PC 9, the voltage supplied from the AC adaptor 10 is supplied to the main body circuit, as well as to a battery (not shown), which is a secondary battery repeating charging and discharging and supplying power to the main body.

Figure 2:
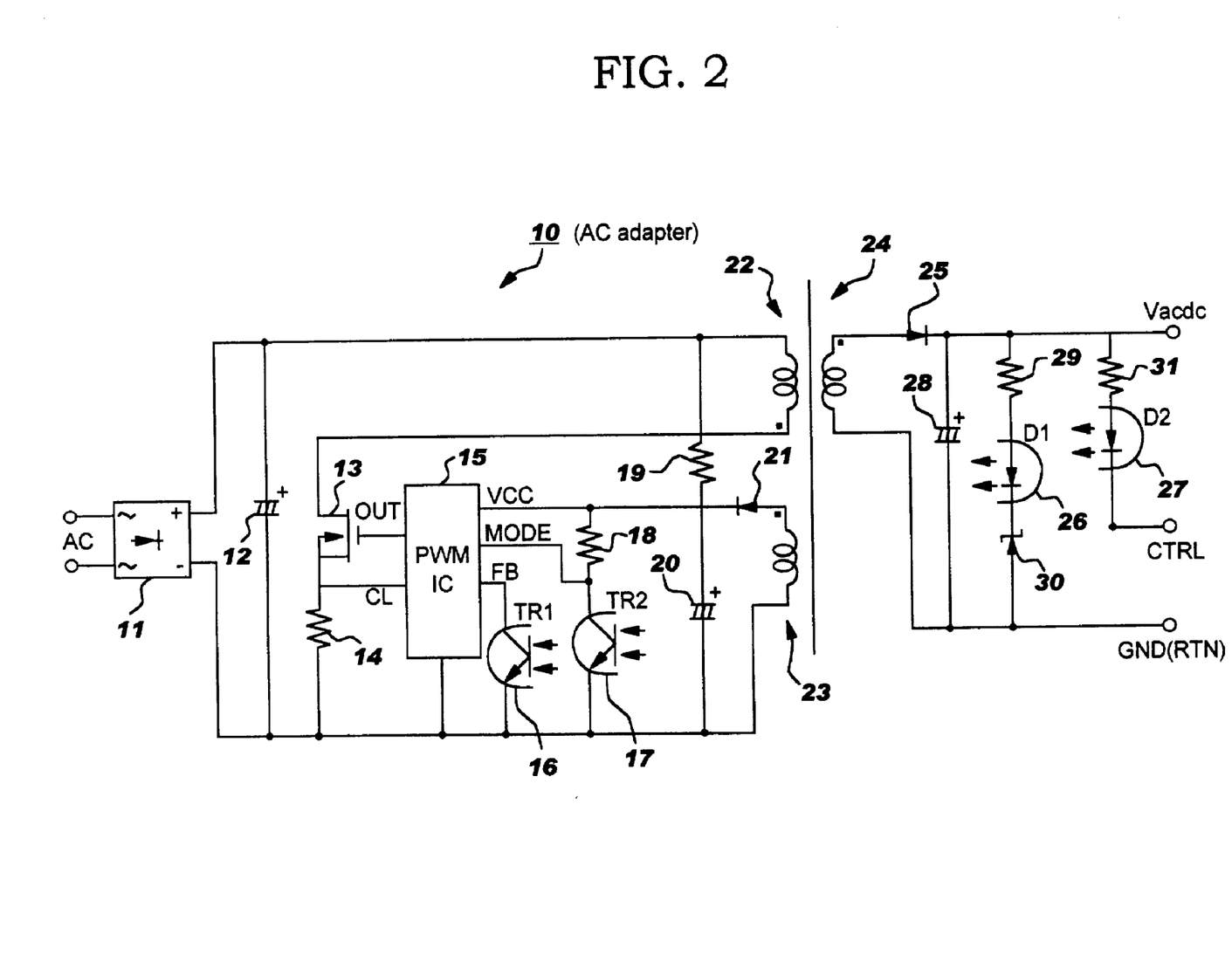
FIG. 2 is a diagram showing a circuit configuration of an AC adaptor in accordance with a preferred embodiment of the present invention.

FIG. 2 is a diagram showing the circuit configuration of an AC adapter 10 in accordance with a preferred embodiment of the present invention. In this embodiment, a first photo-coupler is composed of a coupled secondary photodiode 26 and a primary phototransistor 16, and a second photo-coupler is composed of a coupled secondary photodiode 27 and a primary phototransistor 17. From the point of view of safety, the primary side must be separated from the secondary side, and the photodiode 26 and the photodiode 27 can be separated from the phototransistor 16 and the phototransistor 17, respectively, by operating using light. The primary side of this AC adaptor 10 comprises a rectifier bridge diode 11 for the full-wave rectification of an alternating current voltage, and a capacitor 12 for smoothing the full-wave rectified voltage. The voltage that has been full-wave rectified by the rectifier bridge diode 11 and smoothed by the capacitor 12 is supplied to the primary winding 22.

The primary side further comprises a switching transistor 13 for switching the rectified and smoothed voltage, a PWM (power width modulation) IC 15 for controlling the switching operation of the switching transistor 13 and supplying a prescribed operating frequency, and a current sensing resistor 14 used for protecting from a large current. The primary side also comprises an auxiliary winding 23 for driving the PWM IC 15, a diode 21 for rectifying the current from the auxiliary winding 23, a resistor 19 for first supplying Vcc to the PWM IC 15 prior to the switching operation by the switching transistor 13, and a capacitor 20. The primary side further comprises a phototransistor 16 for controlling the period of PWM with the amplitude of the output voltage on receiving output feedback from the secondary-side photodiode 26, a phototransistor 17 operated by the secondary-side photodiode 27 for controlling the period of PWM, and a resistor 18 for making the voltage level of the mode signal Vcc when the phototransistor 17 is off.

On the other hand, the secondary side comprises a secondary winding 24, a diode 25 for rectifying the output oscillated from the primary side, and a capacitor 28 for smoothing the rectified output. The secondary side also comprises a resistor 29 and a zener diode 30 for measuring the output voltage value of the secondary side, and a photodiode 26 for feeding back the output to the primary side. The secondary side further comprises a photodiode 27 that is turned on when the control terminal (CTRL terminal) is in the GND state and a current limiting resistance 31.

Next the operation of the AC adaptor 10 to which this embodiment is applied will be described below. The period of PWM outputted from the PWM IC 15 is assumed to be 100 kHz in the normal operation. This embodiment is constituted so as to perform the switching operation of the switching transistor 13 at about 20 kHz in the standby state, which is a low-power consumption state, for reducing power consumption in the standby state. The switching of frequencies is performed by the MODE terminal of the PWM IC 15. When the signal level of MODE terminal is the GND level, PWM operation of the first operating frequency, 100 kHZ, is performed, and when the signal level MODE terminal is Vcc, PWM operation of the second operating frequency, e.g., 20 kHz, is performed.

The switching of operating frequencies is performed by controlling the CTRL terminal on the secondary side of the AC adaptor 10. For example, if the CTRL terminal is designed to be open when the note PC 9 is not connected to the AC adaptor 10, no current flows to the secondary-side photodiode 27. Since the primary-side phototransistor 17 becomes off if no current flows to the photo diode 27, the voltage of the MODE terminal becomes Vcc, and PWM operation of e.g., 20 kHz, is performed. Thus, when the note PC 9 is not connected to the AC adaptor 10, the AC adaptor 10 operates at a low frequency (e.g., 10 kHz), and the power consumption in the standby stare is reduced.

Additionally, this embodiment may also be configured such that the CTRL terminal becomes in the GND level when the note PC 9 is connected to the AC adaptor 10. Since a current flows in the photodiode 27 when the CTRL terminal becomes in the GND level, the coupled primary-side phototransistor 17 becomes on. When the phototransistor 17 becomes on, the MODE terminal of the PWM IC 15 becomes in the GND level. As a result, the AC adaptor 10 operates at a normal switching frequency (e.g., 100 kHz).

Figure 3:
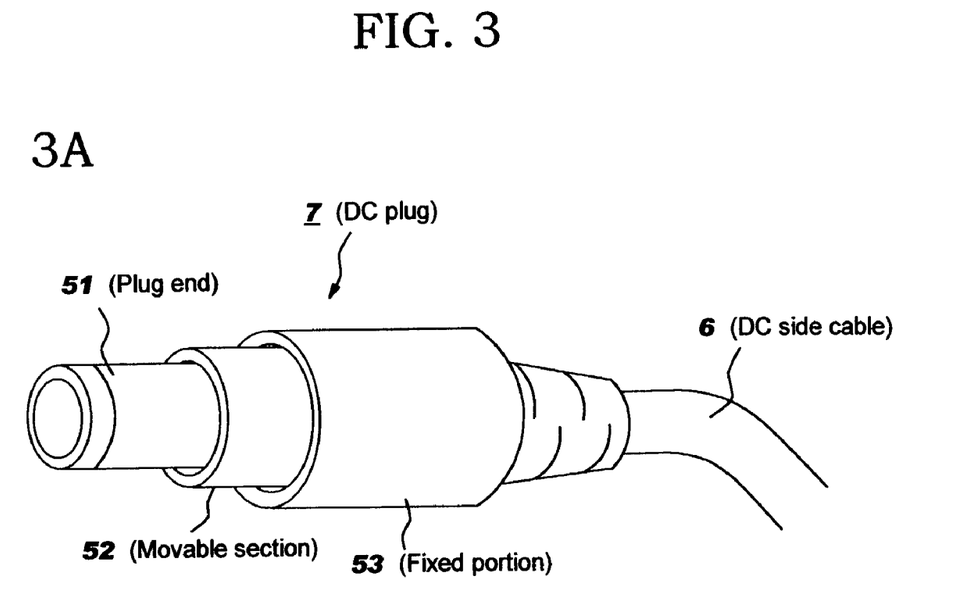
FIGS. 3A and 3B are diagrams illustrating a DC plug 7 in accordance with a preferred embodiment of the present invention.

FIGS. 3A and 3B are diagrams for illustrating the structure of a DC plug 7 in accordance with a preferred embodiment of the present invention. Here, a so-called barrel type DC plug 7 having a built-in mechanical switch is shown. FIG. 3A shows the appearance of a DC plug 7 to which this embodiment is applied. The DC plug 7 comprises a plug end 51 similar to an ordinary barrel type plug end, and a fixed portion 53 that is held by a user to enable attachment and detachment of the DC plug 7, as well as a movable portion 52. The movable portion 52 retracts into the fixed portion 53 when the DC plug 7 is inserted into the jack 8 of the note PC 9, and springs out from the fixed portion 53 when the DC plug 7 is detached from the jack 8.

FIG. 3B is a diagram showing a cut open state of the DC plug 7. The plug end 51 is connected to a $V_{acdc}$ line 42, which is a hot line (output voltage line) from the AC adaptor 10, and a GND line 43, which is a DC return line, and supplies power to the note PC 9. The GND line 43 is also connected to a GND side switch 55 provided on the inner wall of the fixed portion 53. The movable portion 52 is linked to the fixed portion 53 through a spring 56. A control line (CTRL line) 41 from the AC adaptor 10 is linked to the CTRL side switch 54 provided on the movable portion 52.

When the DC plug 7 is connected to the jack 8, the movable portion 52 is pushed to contract the spring 56, and when the movable portion 52 moves by the movable range d shown in FIG. 3B, The CTRL side switch 54 contacts the GND side switch 55. In other words, when the movable portion 52 is pushed, the switch is turned on, and the CTRL line 41 is connected to the GND line 43, turning the CTRL terminal shown in FIG. 2 to the GND level. On the other hand, when the DC plug 7 is disconnected from the jack 8, the pressure to the movable portion 52 is released, and the CTRL side switch 54 is separated from the GND side switch 55 due to expansion of the spring 56. As a result, The CTRL line 41 is disconnected from the GND line 43, and the CTRL terminal shown in FIG. 2 is made open.

To summarize, a movable portion is added to an existing plug as FIGS. 3A and 3B show, and a contact between the CTRL signal and GND is attached to the movable portion so as to make the CTRL signal become in the GND level only when the plug is inserted in the main body of the PC. The AC adaptor 10, which is an AC/DC power source, can thereby perform the 100 kHz operation in the normal state, and becomes in the waiting mode operated at, e.g., 20 kHz in other states, resulting in power saving. This DC plug 7 excels in that the AC adaptor 10, which is an AC/DC power source, can be shifted to the waiting mode using the 2-pin power input jack existing in the jack 8 of the note PC 9 as it is, and the AC adaptor 10 can be shifted to a low-power-loss mode without any design change in the main body of the note PC 9.

Figure 4:
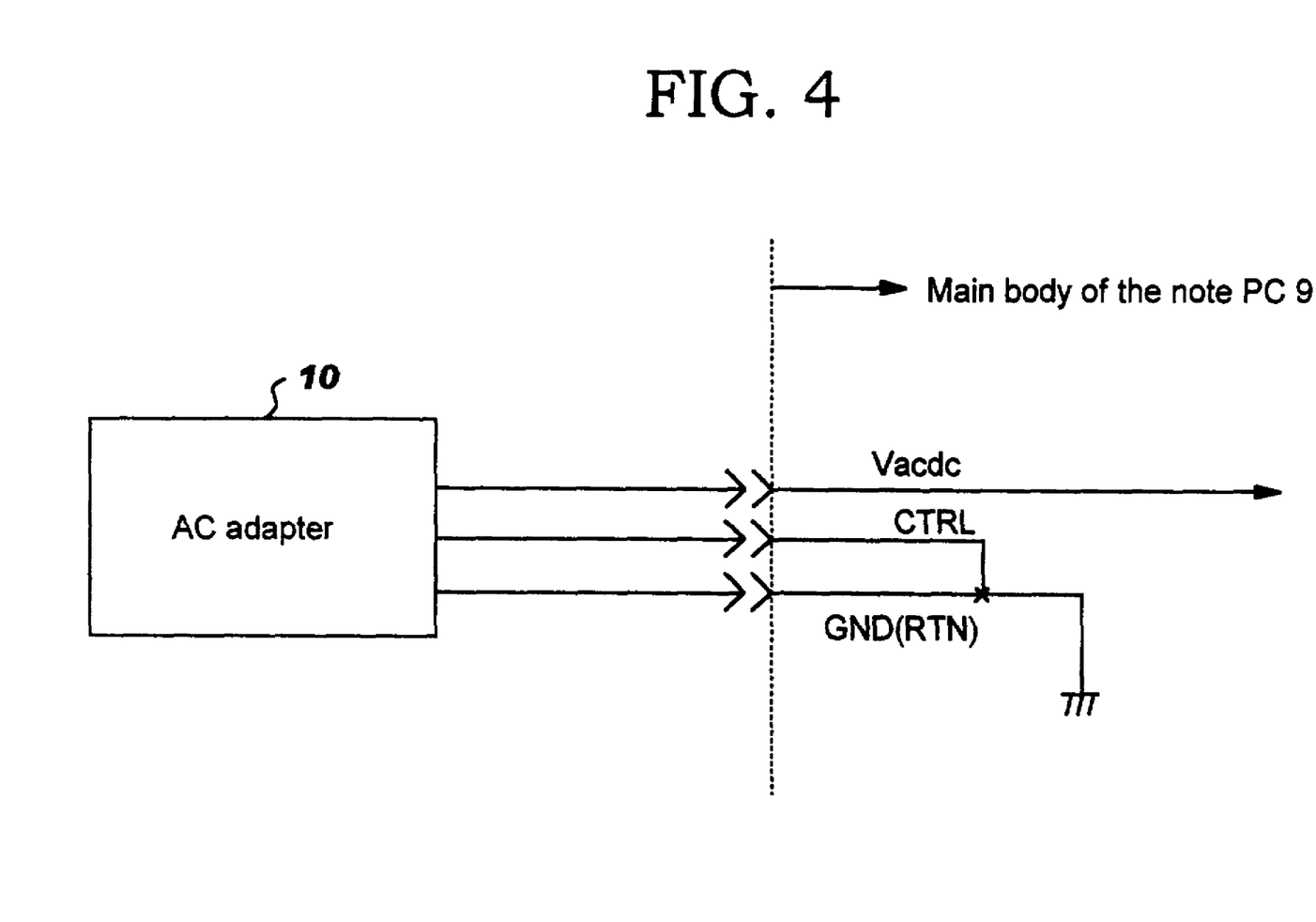
FIG. 4 is a diagram for illustrating mode switching by the internal circuit of a note PC 9.

FIG. 4 is a diagram illustrating mode switching by the internal circuit of the note PC 9. In addition to the constitution in which a mechanical switch is provided in a DC plug 7 as FIGS. 3A and 3B show, the internal circuit of the note PC 9 can be so constituted as to switch modes. That is, when the note PC 9 is connected to the AC adaptor 10, CTRL is unconditionally switched to the GND level as shown in FIG. 4. When the CTRL is switched to the GND level, a current flows in the photodiode 27 shown in FIG. 2, and the primary side coupled phototransistor 17 is turned on. When the phototransistor 17 is turned on, the MODE terminal of the pulse width modulation (PWM) terminal 15 is turned to the GND level. By such constitution, the AC adaptor performs the normal switching operation when the note PC 9 is connected, and performs the waiting mode switching operation when the note PC 9 is not connected.

Figure 5:
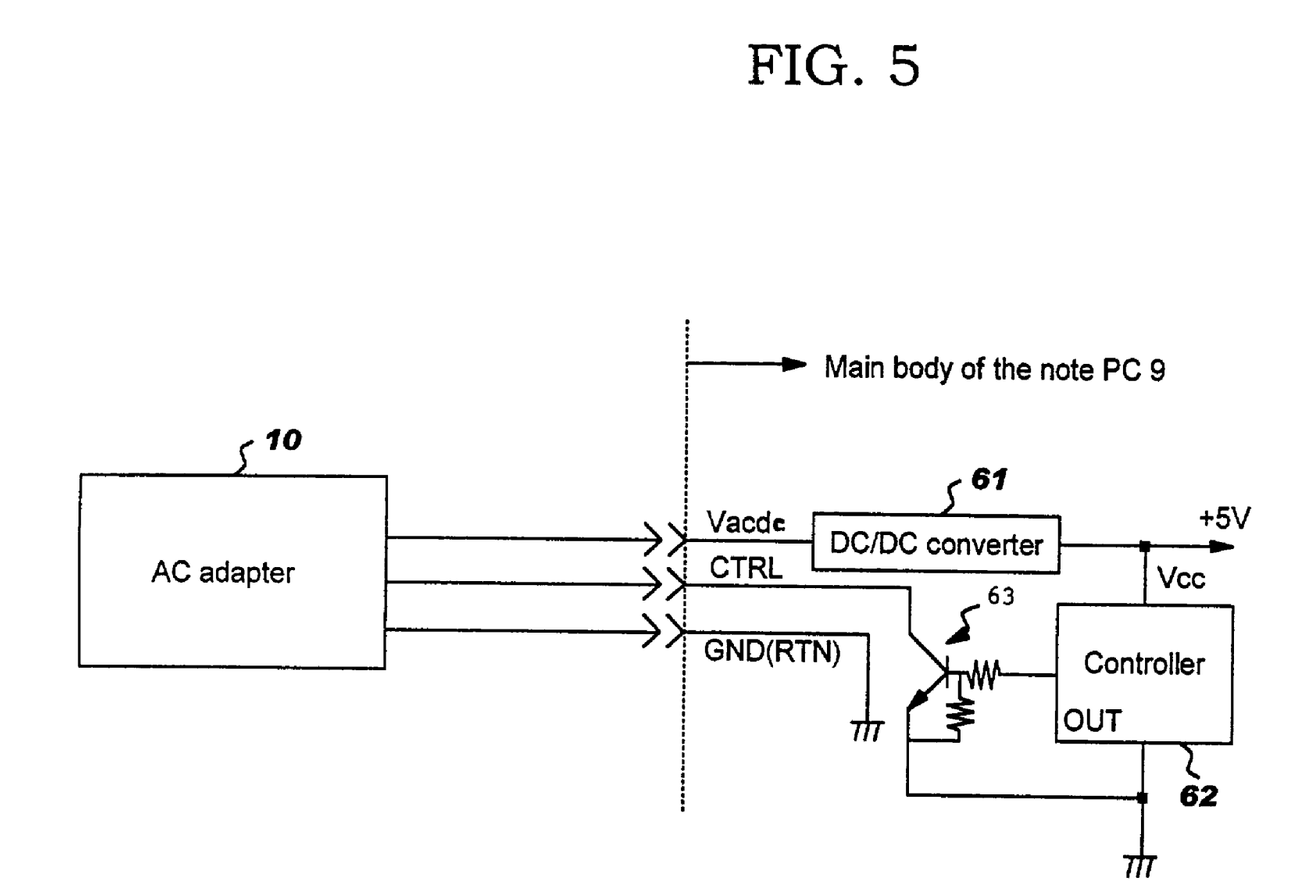
FIG. 5 is a diagram for illustrating another example of mode switching by the internal circuit of a note PC 9.

FIG. 5 is a diagram for illustrating another example of mode switching by the internal circuit of a note PC 9. Here, the note PC 9 comprises a DC/DC converter 61 for supplying a prescribed output voltage from inputted $V_{acdc}$ to the main body circuits, a controller 62 for controlling the power supply section in the note PC 9, and a transistor 63 that operates on the basis of the output from the controller 62. The controller 62 controls the CTRL terminal of the AC adaptor 10.

In the example shown in FIG. 5, the controller 62 turns the level of the OUT terminal of the controller 62 to a low level (GND) when the power consumption by the main body is small, for example in a soft-off state, in which the main body is in the power-off state, but can be operated when an external signal comes in; or in a suspend state, in which the operation of the main body is temporarily halted and power supply is turned off while maintaining the operating state of programs when nothing is inputted for a predetermined period of time. Since the transistor 63 is turned off when the level of the OUT terminal is low, The CTRL terminal of the AC adaptor 10 becomes in an open state, and the AC adaptor 10 operates at 20 kHz of the waiting mode. When the note PC 9 is operated normally, the level of the OUT terminal is made high (Vcc). When the OUT terminal is in the high level, the transistor 63 is turned on, and the level of the CTRL terminal of the AC adaptor 10 becomes a GND level. As a result, the AC adaptor 10 performs switching operation with the normal operating frequency of 100 kHz. According to the example shown in FIG. 5, even if the AC adaptor 10 is connected to the note PC 9, the AC adaptor 10 can be made to a waiting mode when the power consumption by the note PC 9 is small.

Figure 6:
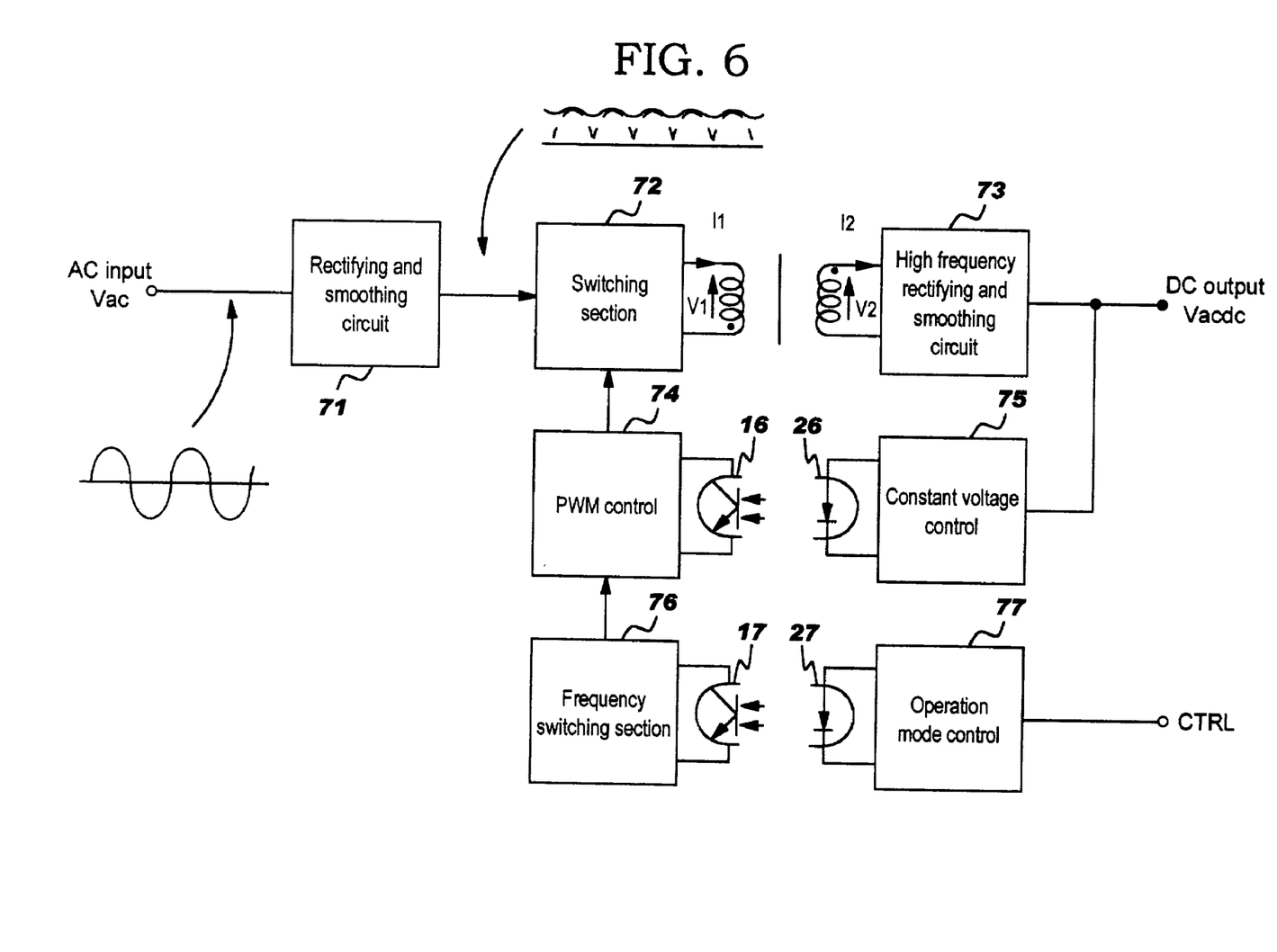
FIG. 6 is a diagram representing the circuit configuration of the AC adaptor 10 shown in FIG. 2 in a block configuration.

FIG. 6 is a diagram representing the circuit configuration of the AC adaptor 10 shown in FIG. 2 in a block configuration. From an AC voltage Vac having a waveform as shown in FIG. 6 obtained from an AC input, through the rectifying and smoothing circuit 71, an input voltage $V_{IN}$ having a waveform as shown in FIG. 6 is applied to the capacitor 12 shown in FIG. 2. This input voltage $V_{IN}$ is converted by the switching section 72 from the current $I_1$ flowing in the primary side winding 22 and the voltage $V_1$ of the primary side winding 22 to the current $I_2$ flowing in the secondary side winding 24 and the voltage $V_2$ of the secondary side shown in FIG. 2. In the secondary side, the voltage $V_2$ is rectified and smoothed by the high frequency rectifying and smoothing circuit 73 consisting of a diode 25 and a capacitor 28 shown in FIG. 2, and outputted to the main body side as a DC output $V_{acdc}$. The secondary side also comprises a constant voltage control 75 that operates the phototransistor 16 with the photodiode 26, and performs the PWM control 74 of the pulse width modulation IC 15. The secondary side also comprises a operation mode control 77 that operates depending on the state of the control terminal, and operates the frequency switching section 76 for switching the switching frequencies of the pulse width modulation IC 15 through a photodiode 27 and a coupled phototransistor 17.

Figure 7:
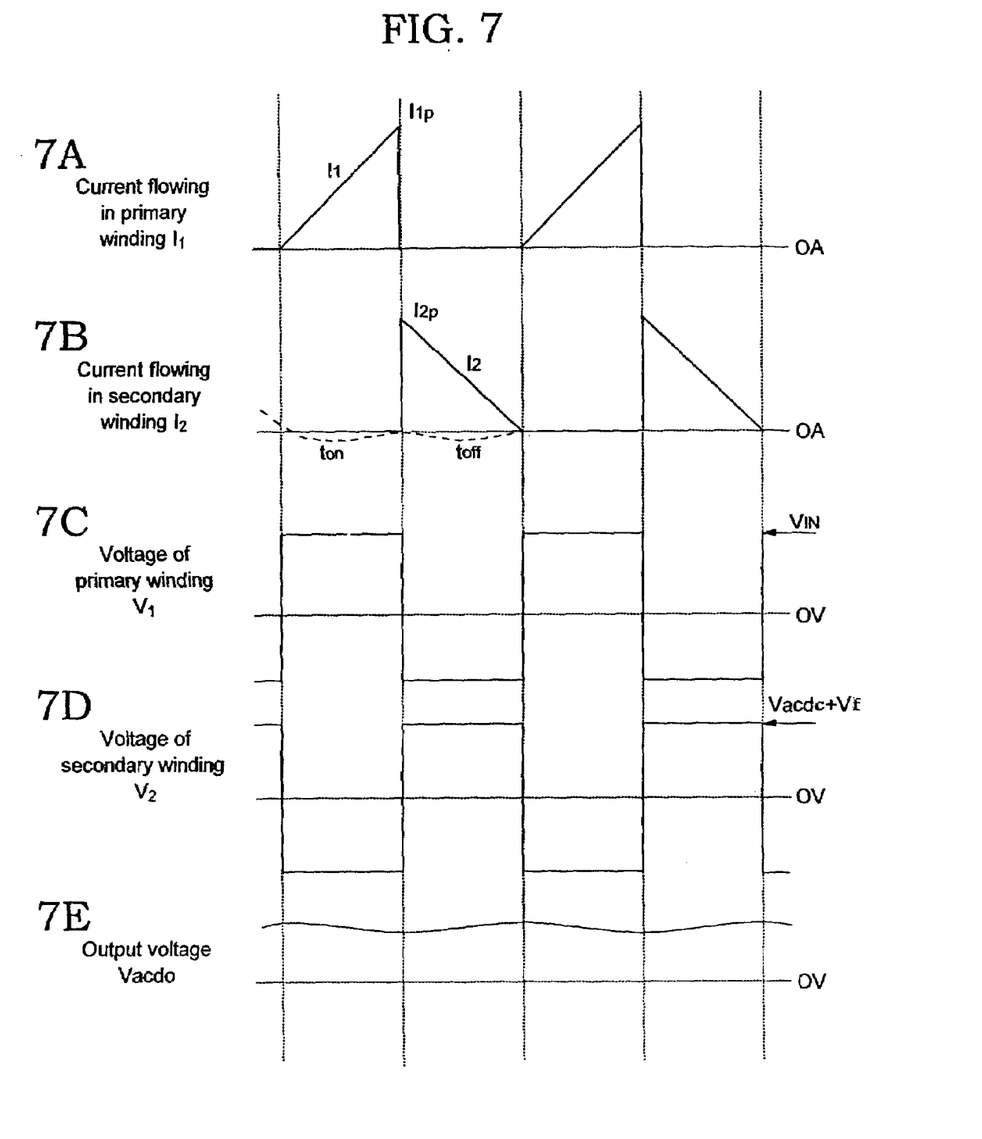
FIGS. 7A to 7E, inclusive, are diagrams showing change in time of currents and voltages in the primary winding and the secondary winding, and output voltages $V_{acdc}$.

FIGS. 7A to 7E are diagrams showing change in time of currents and voltages in the primary winding and the secondary winding, and output voltages $V_{acdc}$. The maximum value of the current flowing in the primary winding (primary current) is represented by $I_{1P}$, the maximum value of the current flowing in the secondary winding (secondary current) is represented by $I_{2P}$, and these are in relationships as shown in FIGS. 7A and 7B at $t_{on}$ and $t_{off}$, respectively. The voltage of the primary winding $V_1$ and the voltage of the secondary winding $V_2$ are outputted after the phases have been inverted as shown in FIGS. 7C and 7D, respectively. Thus, a rectified and smoothed output voltage $V_{acdc}$ as shown in FIG. 7E is obtained.

According to an embodiment of the present invention, power loss when the output current $I_0$ is small, i.e., in a standby state, could be reduced by lowering the frequency of the AC adaptor 10. The reason why the frequency can be lowered when the output current $I_0$ is small will be described below.

Figure 8:
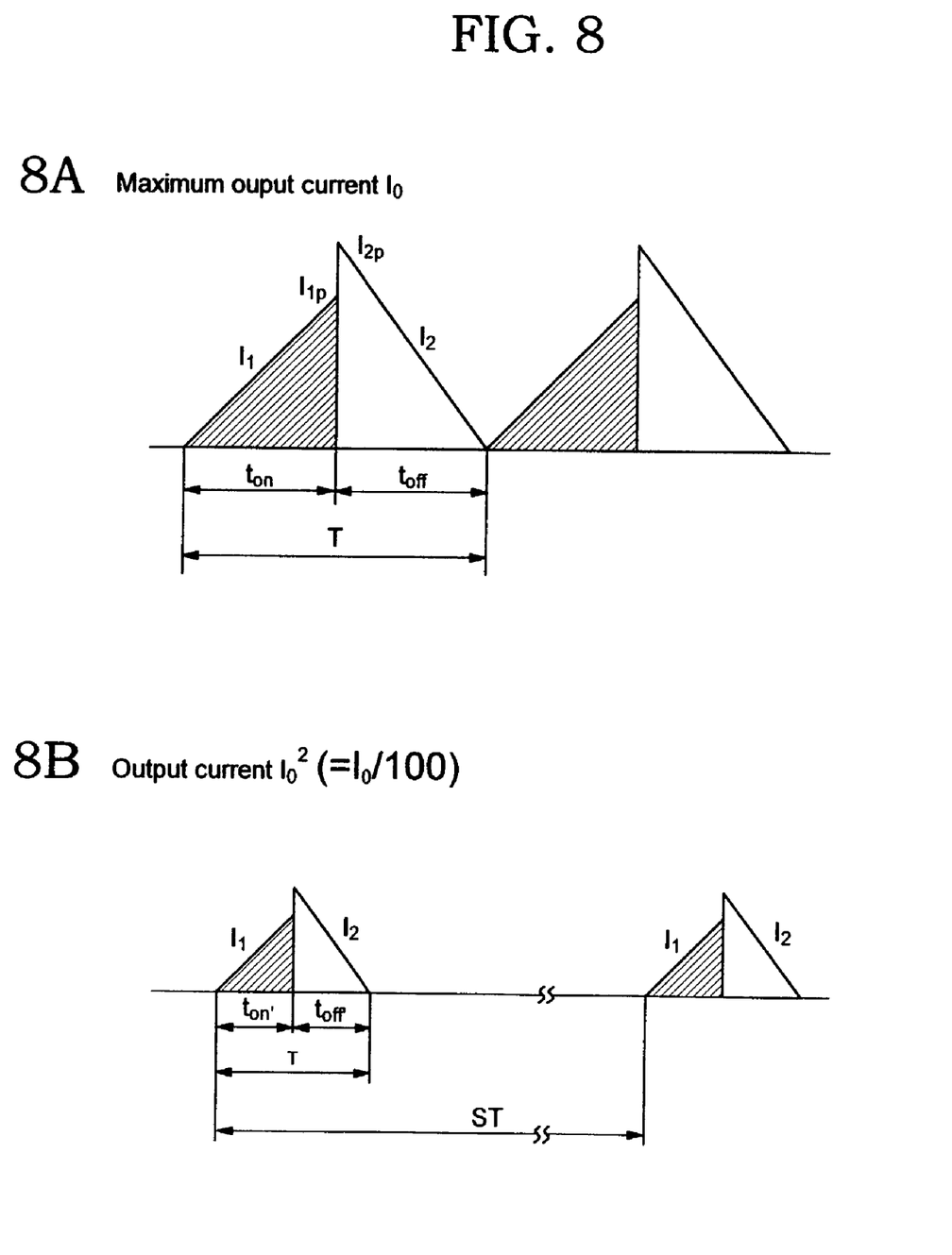
FIGS. 8A and 8B are diagrams showing the relationship between time and output currents.

FIGS. 8A and 8B are diagrams showing the relationship between time and output currents. FIG. 8A is a diagram drawn in the assumption that the AC adaptor 10 is operated at a critical current point at the maximum output current $I_0$, and shows the synthesis of output currents of FIGS. 7A and 7B. FIG. 8B is a diagram for illustrating the state of operation in a discontinuity mode at the output current $I_0'$ (= $I_0/100$).

Here, when the input voltage impressed to the capacitor 12 shown in FIG. 2 is $V_{IN}$, the inductance of the primary winding 22 is $L_P$, and the time when the switching transistor 13 is on is $t_{on}$, the maximum value of the primary current $I_{1P}$ shown in FIG. 8A is expressed by the following equation:

$$I_{1P} = \frac{V_{IN}}{L_P} \cdot t_{on} \qquad \text{Equation 1}$$

At this time, energy P accumulated in the transformer in one switching is expressed by the following equation:

$$P = \frac{1}{2} \cdot L_P \cdot I_{1P}^2 = \frac{V_{IN}^2 \cdot t_{on}^2}{2 L_P} \quad (J) \qquad \text{Equation 2}$$

Therefore, power per unit time P when the switching frequency is f is expressed by the following equation:

$$P = \frac{1}{2} \cdot L_P \cdot I_{1P}^2 \cdot f = \frac{V_{IN}^2 \cdot t_{on}^2}{2 L_P} \cdot f \quad (W) \qquad \text{Equation 3}$$

Also, since the power accumulated in the transformer is equal to the power consumed in the secondary side, the relation between the output voltage $V_{acdc}$ represented by $V_0$, the output current $I_0$, and the forward voltage drop $V_f$ of the diode 25 is expressed by the following equation:

$$\frac{1}{2} \cdot L_P \cdot I_{1P}^2 \cdot f = \frac{V_{IN}^2 \cdot t_{on}^2}{2 L_P} \cdot f = I_0 \cdot (V_0 + V_f) \qquad \text{Equation 4}$$

Here, the switching frequency in the normal operation of the AC adaptor 10 is assumed to be 100 kHz, the output current is assumed to be 5 A, the switching frequency in the standby state is assumed to be 20 kHz, and the output current is assumed to be 50 mA. At this time, as is obvious form the following equation derived from Equation 4, if the frequency is 20 kHz when the output current is 5 A, the output voltage in the standby state $V_0'$ becomes lower than $V_0$, and the specifications of the output voltage cannot be satisfied.

$$V_0' = \frac{V_{IN}^2 \cdot t_{on}^2}{2 L_P \cdot I_0} \cdot \frac{f}{5} - V_f < \frac{V_{IN}^2 \cdot t_{on}^2}{2 L_P \cdot I_0} \cdot f - V_f = V_0 \qquad \text{Equation 5}$$

However, since the output current $I_0'$ is (1/100)·$I_0$, the output voltage $V_0'$ can output the voltage value $V_0$. However, as shown in FIG. 8B, the switching time $t_{on}'$ at this time becomes:

$$t_{on}' = \frac{t_{on}}{\sqrt{10}} \qquad \text{Equation 6}$$

Thus, it can be understood that the frequency of the AC adaptor 10 can be lowered in the standby state of the note PC 9 when the output current $I_0'$ is small.

Thus, according to the embodiment of the present invention, for example, when the main body of a note PC 9 is not connected, the power loss of the AC adaptor 10, which is a power supply device, can be reduced, contributing to energy saving and the prevention of global warming. In addition, besides by connection to or disconnection from the main body, the power loss can be reduced by lowering the operating frequency of the power supply device in a predetermined standby state such as the soft-off or suspend state.

Although the case where the AC adaptor 10, which is a power supply device, is present outside the housing of the main body of the note PC 9 is described in the embodiment of the present invention, the similar reduction of power loss can be achieved when the power supply device is incorporated in the housing. In other words, although the aspect for reducing operating frequencies may be different, whether the power supply device is physically separated from the main body or not is out of the question. Also, although a note PC 9 is described as an example of the use of the power supply device, the present invention can be applied to general household electrical appliances comprising a power supply device. Although the prescribed standby state may be different from the soft-off or suspend state in the note PC 9, the reduction of power loss can be achieved in the state on the assumption of resuming operation when this embodiment is applied in a prescribed standby state in which the main apparatus in not in operation, regardless of the presence or absence of a battery in the main body.

Furthermore, this embodiment was constituted so as to perform the switching operation at a normal operating frequency when the control (CTRL) side is open, and at standby state operating frequency when the CTRL side becomes the GND level as the DC return level (short-circuited). However, in some circuit constitutions, the switching operation can be performed by inverting the short-circuiting and opening of the CTRL side. In addition, the state of the CTRL signal is not limited to the GND level and the open state, but may be the combination of the GND level and the $V_{acdc}$ level, the $V_{acdc}$ level and the open state, or other distinguishable combinations.

According to the present invention, as described above, the power loss of a power supply device can be minimized in the prescribed waiting time.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An AC adaptor connectable to a main body of an apparatus through a power line, comprising:
    a rectifying and smoothing circuit to rectify and smooth an alternating current voltage;
    a switching section to switch the rectified and smoothed alternating current voltage at a prescribed operating frequency, wherein a level of the prescribed operating frequency is proportional to a value of an output voltage of the AC adaptor in a voltage line associated with the power line;
    an operating frequency control unit to control the prescribed operating frequency of the switching section based on a control line associated with the power line, wherein the operating frequency control unit controls the switching section to switch according to a first operating frequency when the main body of the apparatus operates in a normal state, and controls the switching section to switch according to a second operating frequency when the power line is separated from the main body of the apparatus or when the main body of the apparatus is in a prescribed standby state, the second operating frequency being lower than the first operating frequency; and
    a plug to connect the power line to the main body of the apparatus, wherein the plug comprises an operating section that provides a control signal through the control line to the operating frequency control unit to switch the prescribed operating frequency from the second operating frequency to the first operating frequency when the plug is connected to the main body of the apparatus.

2. The AC adaptor according to claim 1, wherein the power line comprises the voltage line, a DC return line, and the control line for switching the prescribed operating frequency.

3. The AC adaptor according to claim 2, wherein the control signal to switch the prescribed operating frequency is generated by short-circuiting or opening the control line against the DC return line.

4. A power supply device for supplying electric power to a main body of an apparatus by performing a prescribed switching operation, comprising:
    a switching unit to perform a switching operation for a primary power source;
    a control unit to control the switching operation performed by the switching unit, wherein the control unit controls the switching unit to switch according to a first operating frequency when the main body of the apparatus is operating in a normal state, and controls the switching unit to switch according to a second operating frequency when the main body of the apparatus is operating in a low power consumption mode, the second operating frequency being lower than the first operating frequency; and
    a plug to connect the power supply device to the main body of the apparatus, wherein the plug comprises an operating section that provides a control signal to the control unit to switch a switching frequency of the switching unit from the second operating frequency to the first operating frequency when the plug is connected to the main body of the apparatus.

5. The power supply device according to claim 4, further comprising:
    an output voltage line to supply electric power to the main body of the apparatus, a DC return line, and a control line, a state of the control line being changed by whether the main body is in a low power consumption mode or not,
    wherein the control signal for switching between the first operating frequency and the second operating frequency comprises the state of the control line.

6. The power supply device according to claim 5, wherein the state of the control line is changed by operation of a controller within the main body of the apparatus.

7. A Voltage Supply apparatus comprising:
    an electrical device connected to an alternating current power source through a DC voltage supply device that is separate from the electrical device,
    wherein the DC voltage supply device supplies a DC voltage to a main body of the electrical device, the DC voltage supply device including,
        a rectifying and smoothing circuit to rectify and smooth an alternating current voltage from the alternating current power source;
        a switching unit to switch the rectified and smoothed alternating current voltage;
        an operating frequency supplying unit to supply a first operating frequency of switching performed by the switching unit when the electrical device is operating in a normal state and supply a second operating frequency frequency when the electrical device is operating in a standby state, the second operating frequency being lower than the first operating frequency; and a plug to connect the DC voltage supply device to the main body of the electrical device, wherein the plug comprises a plug end configured to be inserted into a jack of the main body of the electrical device; and the main body of the electrical device includes control circuitry operable to shift an operating frequency supplied by the operating frequency supplying unit to the second operating frequency when the main body of the electrical device is operating in the standby state even if the DC voltage supply device is connected to the main body of the electrical device.

8. The apparatus according to claim 7, wherein the standby state includes a soft-off or suspend state of the main body of the electrical device.

9. An electrical device comprising:
an AC adaptor connected to an alternating current power source, the AC adaptor to supply a DC voltage;
a main apparatus connected to the AC adaptor through a power line, the main apparatus being activated by the DC voltage output from the AC adaptor;
a rectifying and smoothing circuit to rectify and smooth an alternating current voltage from the alternating current power source;
a switching section to switch the rectified and smoothed alternating current voltage at a prescribed operating frequency, wherein a level of the prescribed operating frequency is proportional to a value of the DC voltage supplied from the AC adaptor; and
an operating section that operates to change the prescribed operating frequency of the switching section depending on a state of connection between the AC adaptor and the main apparatus through the power line,
wherein the operating section is built into a plug located at an end of the power line that connects the AC adaptor to the main apparatus, wherein the operating section respectively implements the changing of the prescribed operating frequency of the switching section corresponding to when the plug is attached and detached from the main apparatus.

10. The device according to claim 9, wherein the operating section reduces the prescribed operating frequency from a normal operating frequency when the plug is detached from the main apparatus or when the main apparatus is operating in low power mode.

11. A method for operating an AC adaptor that supplies a DC voltage to a main body of an apparatus through a power line, the method comprising:
rectifying and smoothing an alternating current voltage;
switching the rectified and smoothed alternating current voltage at a prescribed operating frequency, wherein a level of the prescribed operating frequency is proportional to a value of an output voltage of the AC adaptor in a voltage line associated with the power line;
controlling the prescribed operating frequency based on a control line associated with the power line, wherein the prescribed operating frequency is controlled to switch according to a first operating frequency when the main body of the apparatus operates in a normal state, and the prescribed operating frequency is controlled to switch according to a second operating frequency when the power line is separated from the main body of the apparatus or when the main body of the apparatus operates in a prescribed standby state, the second operating frequency being lower than the first operating frequency; and connecting the power line to the main body of the apparatus through a plug, wherein the plug comprises an operating section that provides a control signal through the control line to the operating frequency control unit to switch the prescribed operating frequency from the second operating frequency to the first operating frequency when the plug is connected to the main body of the apparatus.

12. The method for operating an AC adaptor according to claim 11, wherein the prescribed standby state is a state in which the main body of the apparatus operates in a soft-off or suspend state.

13. The method for operating an AC adaptor according to claim 11, further comprising:
generating a control signal to switch the prescribed operating frequency by short-circuiting or opening the control line against a DC return line associated with the power line.

14. An AC adaptor connectable to a main body of an apparatus through a power line, comprising:
a rectifying and smoothing circuit to rectify and smooth an alternating current voltage;
a switching section to switch the rectified and smoothed alternating current voltage at a prescribed operating frequency, wherein a level of the prescribed operating frequency is proportional to a value of an output voltage of the AC adaptor in a voltage line associated with the power line;
an operating frequency control unit to control the prescribed operating frequency of the switching section, wherein the operating frequency control unit controls the switching section to switch according to a first operating frequency when the main body of the apparatus operates in a normal state, and controls the switching section to switch according to a second operating frequency when the power line is separated from the main body of the apparatus or when the main body of the apparatus is in a prescribed standby state, the second operating frequency being lower than the first operating frequency; and
a plug to connect the power supply to the main body of the apparatus, wherein the plug comprises,
a plug end configured to be inserted into a jack of the main body of the apparatus;
a fixed portion operable to be held by a user for attachment of the plug to the jack and detachment of the plug from the jack; and
a moveable portion that retracts into the fixed portion when the plug end is inserted to the jack and springs out from the fixed portion when the plug end is detached from the jack, wherein the plug provides a control signal through the control line to the operating frequency control unit for switching the prescribed operating frequency from the second operating frequency to the first operating frequency when the plug end is inserted to the jack and switching the prescribed operating frequency from the first operating frequency to the second operating frequency when the plug end is detached from the jack.

15. The AC adaptor of claim 14, wherein the plug end comprises a barrel type end plug.

16. The AC adaptor of claim 15, wherein the jack comprises a 2-pin power input jack.

* * * * *